United States Patent [19]

Eddy et al.

[11] 4,196,256

[45] Apr. 1, 1980

[54] LONG LIFE FUSER ROLL

[75] Inventors: Clifford O. Eddy; George J. Safford; Edward F. Bowler, Jr., all of Webster, N.Y.

[73] Assignee: Xerox Corporation, Stamford, Conn.

[21] Appl. No.: 937,390

[22] Filed: Aug. 28, 1978

[51] Int. Cl.$^2$ ...................... G03G 13/20; B32B 15/08; B32B 27/28

[52] U.S. Cl. ...................................... 428/422; 430/99; 118/101; 427/34; 427/194; 427/195; 427/379; 427/409; 427/423; 428/461, 430/99

[58] Field of Search ................. 427/34, 379, 194, 195, 427/409, 423; 428/422, 461; 118/101; 96/1 R

[56] References Cited

U.S. PATENT DOCUMENTS

| | | | |
|---|---|---|---|
| T934,010 | 5/1975 | Maskornick . | |
| 3,112,211 | 11/1963 | Ward | 427/423 X |
| 3,132,123 | 5/1964 | Harris et al. | 260/87.5 |
| 3,268,351 | 8/1966 | Van Dorn | 427/444 |
| 3,697,309 | 10/1972 | Werner | 427/379 |
| 3,776,760 | 12/1973 | Baker | 427/379 |
| 3,912,901 | 10/1975 | Strella et al. | 219/216 |
| 3,942,230 | 3/1976 | Nalband | 427/34 |
| 3,976,814 | 8/1976 | Murphy | 427/194 X |
| 4,075,390 | 2/1978 | Murphy | 427/194 X |
| 4,101,267 | 7/1978 | Mueller et al. | 118/101 X |
| 4,128,693 | 12/1978 | Dhami et al. | 428/422 X |
| 4,148,937 | 4/1979 | Kurachi et al. | 427/194 |
| 4,150,181 | 4/1979 | Smith | 427/194 |

FOREIGN PATENT DOCUMENTS

| | | |
|---|---|---|
| 894898 | 3/1972 | Canada . |
| 1184561 | 3/1970 | United Kingdom . |

OTHER PUBLICATIONS

Journal of Polymer Science, 1970, Part A-1, vol. 8, pp. 1091–1098.

U.S. Ser. No. 612,074, filed 9-10-75, Styjewski et al., filed as priority papers in French Pat. No. 2,324,035.

*Primary Examiner*—Harold Ansher
*Attorney, Agent, or Firm*—Ernest F. Chapman

[57] ABSTRACT

A method of depositing and affixing a layer of a copolymer of perfluoroalkyl perfluorovinyl ether and tetrafluoroethylene upon a metal surface and the article prepared thereby, is disclosed. A flame sprayed metal surface having an optional fluoropolymer primer thereon is powder coated with the copolymer of perfluoroalkyl perfluorovinyl ether and tetrafluoroethylene and the powder is fused thereon. An improved long life fuser member for use in a fusing apparatus for fixing toner images to copy sheets by the application of heat and pressure is described.

41 Claims, 5 Drawing Figures

LONG LIFE FUSER ROLL

BACKGROUND OF THE INVENTION

This invention relates to laminated articles, and more particularly to resin-coated metal substrates, and to methods for manufacturing such articles. In more preferred embodiments, this invention relates generally to heat fusing methods and devices, and more particularly, to an improved fuser member and method of manufacturing fuser members.

As used herein, the laminated article or fuser member may be a roll, a flat surface, a curved surface or any other shape. The invention is particularly useful in the field of xerography where images are electrostatically formed and developed with resinous powders known as toners, and thereafter fused or fixed onto sheets of paper or other substrates to which the powder images have been transferred. The resinous powders or toners contain thermoplastic resins which are heat softenable, and they are used conventionally in a variety of commercially known methods. The invention also has utility in the field of coating metal substrates, for example in the production of cooking utensils and other surfaces used in the culinary arts and in coating molds and dies to produce surfaces which provide release.

In order to fuse images formed of the resinous powders or toners, it is necessary to heat the powder and the substrate to which it is to be fused, to a relatively high temperature, generally in excess of about 93° C. This will vary depending upon the softening range of the particular resin used in the toner. Generally, even higher temperatures are contemplated such as approximately 160° C., or higher. It is generally undesirable however to raise the temperature of the substrate substantially higher than 190° C. in xerographic applications because of the tendency of the substrate to discolor at such elevated temperatures, particularly when the substrate is paper.

It has long been recognized that one of the fastest and most positive methods of applying heat for fusing the powder image is direct contact of the resinous powder with a hot surface, such as a heated roll. But, in most instances as the powder image is tackified by heat, part of the image carried by the support material will stick to the surface of the plate or roll so that as the next sheet is advanced on the heated surface, the tackified image, partially removed from the first sheet, will partly transfer to the next sheet and at the same time part of the tackified image from said next sheet would adhere to the heated roll. This process is commonly referred to in the art as "offset", a term well-known in the art.

There are many prior art methods and devices for overcoming the offset of toner, e.g., by forwarding the sheet or web of substrate material bearing the toner image between two rolls at least one of which is heated, the rolls contacting the image being provided with a thin coating of tetrafluoroethylene resin and a silicone oil film to prevent toner offset. The outer surfaces of such rolls have also been fabricated of fluorinated ethylene/propylene or silicone elastomers coated with silicone oil as well as silicone elastomers containing low surface energy fillers such as fluorinated organic polymers, and the like. The tendency of these rolls to pick up the toner generally requires some type of release fluid continuously applied through the surface of the roll to prevent such offset. Silicone oils are generally well adapted for this purpose. Fuser rolls coated with tetrafluoroethylene resin are described by Van Dorn in U.S. Pat. No. 3,268,351 and by Baker et al. in U.S. Pat. No. 3,776,760. Both the tetrafluoroethylene resin and the silicone oil have physical characteristics such that they are substantially abhesive to dry or tackified resinous toners. "Abhesive" has used herein, defines a surface that has "release" characteristics such that it is highly repellant to sticky or tacky substances.

Although the use of tetrafluoroethylene resin-coated rolls in xerographic reproducing apparatus has been a great improvement, such rolls generally have a life sufficient to fuse about 100,000 to 200,000 copies in a xerographic copying apparatus before there is a loss of integrity of the coating by wear and/or accident. Since it is expensive to manufacture and install fuser rolls, it is desirable to extend the life of such rolls. Not only does this result in economy, but it also reduces inconvenience for machine users because it reduces machine down time.

Abrasion resistant resin materials such as resin copolymers of perfluoroalkyl perfluorovinyl ethers and tetrafluoroethylene are well known and are described in U.S. Pat. No. 3,132,123 and the abrasion resistance as well as the "abhesive" nature of these copolymers makes them desirable surface materials for many utilities. However, because of their "abhesive" nature, it is difficult to manufacture articles having a surface coating of a resin copolymer or copolymers of perfluoroalkyl-perfluorovinyl ether and tetrafluoroethylene upon a metal substrate. Laminated rolls where the outer surface coating is glued or cemented to the roll as in Defensive Publication No. T934,010, Official Gazette 9, have been suggested as improved fuser rolls, however, such rolls also easily lose their integrity, for example, by peeling from the roll in areas where the cement is weakened. The outer surface of such rolls often lose adhesion by deterioration of the etched surface. Furthermore, the use of cements and glues causes a thicker layer thereby reducing thermal conduction from the interior of the roll to the surface of the coating in fuser modes using internal heating to provide a suitable fusing temperature.

Laminated rolls wherein the outer surface coating is tetrafluoroethylene, hexafluoropropylene, monochlorotrifluoroethylene or tetrafluoroethylene/hexafluoropropylene have also been suggested as fuser rolls, however, such rolls generally easily lose their integrity and also lack abrasion resistance resulting in a short life. Accordingly, such rolls are characterized by the disadvantages discussed above.

Another disadvantage of the prior art fuser members which have the conventional surface coatings discussed above is fourteen inch (14") offset. Fuser members normally accomodate fourteen inch substrates such as paper. However, when eleven inch (11") substrate such as paper or any substrate less than the maximum size of the fuser member is used, toner adheres to the area of the fuser member not covered by the substrate. When a larger size substrate is then contacted by the fuser member, the toner adhering to the fuser member in areas not previously contacted by a substrate, is offset upon the substrate.

OBJECTS OF THE INVENTION

Accordingly, the principal object of this invention is to provide a new and improved laminated article and a method of making such article wherein the foregoing disadvantages have been overcome.

Another object of the present invention is to provide a new and improved method of coating a resin copolymer of perfluoroalkyl perfluorovinyl ether and tetrafluoroethylene upon a metal substrate.

Still another object of this invention is to provide an improved method of coating a resin copolymer of perfluoroalkyl perfluorovinyl ether and tetrafluoroethylene upon a metal substrate without the assistance of cement or glue to adhere the resin copolymer to the substrate.

It is another object of this invention to provide a new and improved fusing apparatus for utilization in an electrostatic copier apparatus.

Another object of this invention is to provide a new and improved fuser member having a surface of a resin copolymer of perfluoroalkyl perfluorovinyl ether and tetrafluoroethylene for a fusing apparatus in a xerographic copier.

Another object of this invention is to provide a fuser roll coated with a copolymer resin of perfluoroalkyl perfluorovinyl ether and tetrafluoroethylene to produce a fuser roll having greater durability and greater abrasion resistance.

SUMMARY OF THE INVENTION

These and other objects of the invention are accomplished by a laminated article comprising a support member having a rough, flame sprayed metal surface layer; optionally a fluoropolymer primer baked upon the flame sprayed metal surface; and an outer layer, said outer layer comprising a copolymer resin of perfluoroalkyl perfluorovinyl ether and tetrafluoroethylene, said outer layer being placed upon the primer layer in the form of a powder coating and fused thereon. When the laminated article is a fuser member for a fusing aparatus utilized in fixing toner images to support sheets in a xerographic or similar apparatus, the fuser member preferably comprises a metal substrate; a porous metal plate flame sprayed upon and substantially covering the metal substrate; a fluoropolymer primer baked upon and substantially covering the flame sprayed porous metal plate; and a powder resin copolymer of tetrafluoroethylene and perfluoroalkyl perfluorovinyl ether fused upon and substantially covering the baked primer layer.

The copolymer resin of tetrafluoroethylene and perfluoroalkyl perfluorovinyl ether is uncrosslinked, and is designated herein as thermoplastic. The ether of the thermoplastic copolymer resin of perfluoroalkyl perfluorovinyl ether and tetrafluoroethylene of the present invention has the formula: $C_nF_{2n+1}—O—CF=CF_2$, wherein n is a number from 1 to 5 inclusive. These thermoplastic copolymer resins are disclosed in U.S. Pat. No. 3,132,123 and are commercially available from E. I. du Pont de Nemours and Company of Wilmington, Del.

In accordance with the present invention, the outer thermoplastic resin copolymer of perfluoroalkyl perfluorovinyl ether and tetrafluoroethylene must be deposited as a powder material upon the optionally primed, porous metal plate flame sprayed upon a support member, such as a metal substrate. In accordance with the present invention, a fluoropolymer primer may be deposited upon the porous or roughened flame sprayed metal layer prior to the powder coating of the uncrosslinked resin copolymer of perfluoroalkyl perfluorovinyl ether and tetrafluoroethylene.

In accordance with the present invention, there is also provided a method of coating a substrate or a method for manufacturing a laminated article by providing a support member; applying a porous metal plate on the support member by a flame spraying process; optionally applying fluoropolymer primer to the porous metal plate; heating the fluoropolymer primer if present until the primer is baked; applying powder resin copolymer of tetrafluoroethylene and perfluoroalkyl perfluorovinyl ether to the baked, primer-coated metal plate or to the metal plate itself; and heating the powder resin copolymer at a temperature sufficient to fuse the powder resin copolymer until fusion is complete.

By this article and method of manufacturing the article, not only is the release of tackified toner or other sticky substances promoted, but it also permits the deposit of a thin film of the resin copolymer, as thin as a fraction of a mil, e.g., 0.5 mil (0.013 mm).

In preferred embodiments the primer is recommended when the thickness of the resin copolymer deposited upon the surface is about 1 mil (0.025 mm) or less. The primer may also be used when the thickness of the resin copolymer upon the surface is greater than 1 mil (0.025 mm), however, the resin copolymer may be deposited upon the porous flame sprayed plate without the primer layer. Thus, in certain embodiments the primer is optional.

The laminated articles and the method of making the laminated articles in accordance with the present invention, may be made upon any suitable substrate of any desired configuration. The laminated article may comprise a flat substrate or support member, a circular or tubular substrate or support member, a curved substrate or support member or any other preferred geometry of a suitable shape for depositing a flame sprayed metal plate thereon and thereafter optionally applying at least one layer of fluoropolymer primer and thereafter applying at least one layer of resin copolymer of tetrafluoroethylene and perfluoroalkyl perfluorovinyl ether. The substrate may be of any suitable material which will withstand the flame spraying of the desired metal or metals and the baking and fusing of the resin layers placed thereon.

Although the laminated articles and the method of making the laminated articles of the present invention have utility in many areas, such as the coating of utensils useful in the cooking and culinary arts and the cost of molds and dies, one of the most preferred utilities, and the utility described in detail herein, is the use of the laminated articles and the method of making the laminated articles of the present invention for making fuser members, and as used herein, fuser members may be rolls, flat surfaces, belts, or any other type of suitable configuration.

Further objects of this invention together with additional features and advantages thereof will become apparent from the following detailed description of the preferred embod ments of the invention when read in conjunction with the accompanying drawings.

DESCRIPTION OF THE PREFERRED EMBODIMENTS

Figure 1:
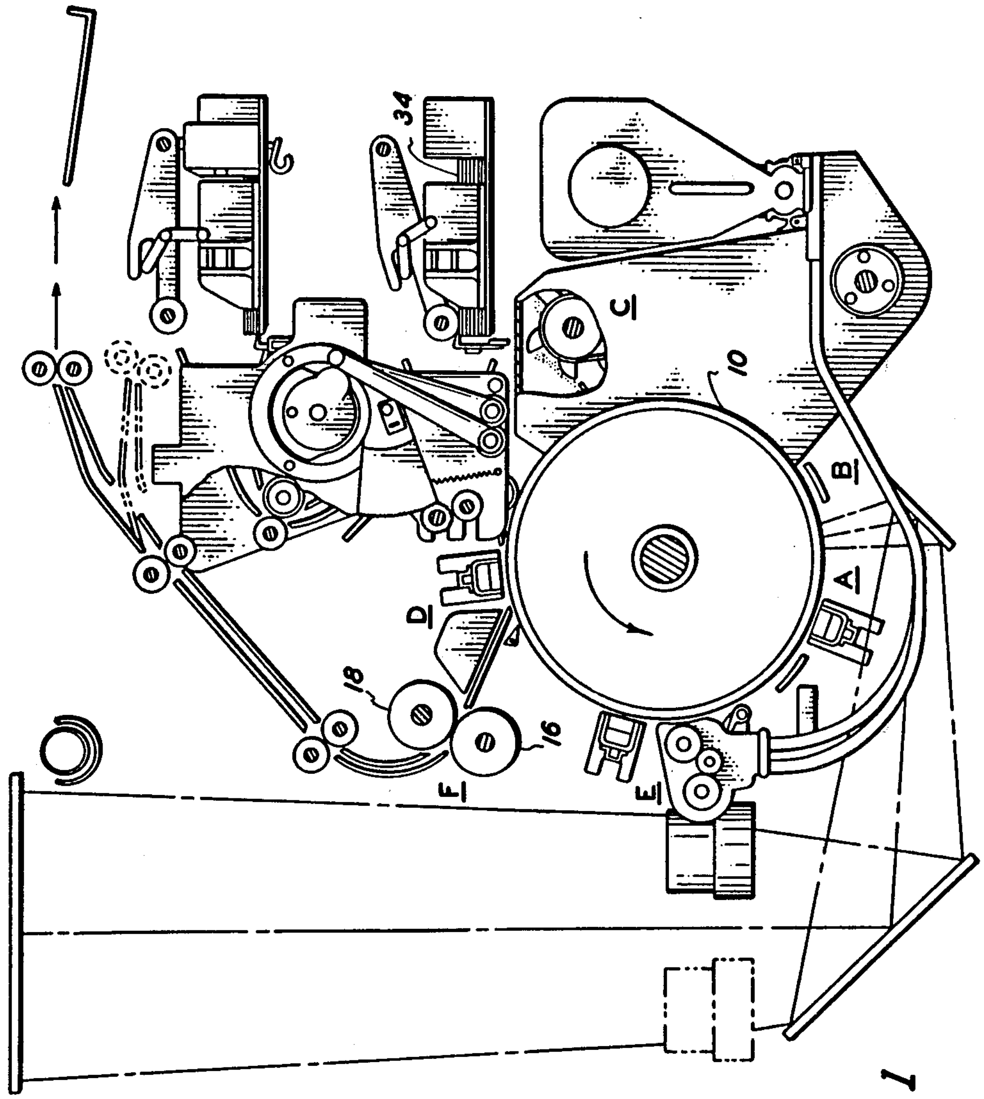
FIG. 1 is a schematic representation of a xerographic reproducing apparatus incorporating a contact fusing system having a laminated fuser member made in accordance with the present invention.

Referring to the drawings, especially FIG. 1, there is shown an automatic xerographic reproducing machine incorporating a roll fuser system having a fuser member made by the laminating method of the present invention. The automatic xerographic reproducing machine includes a xerographic plate or surface 10 formed in the shape of a drum. The plate has a photoconductive layer or light sensitive surface on a conductive backing journaled in a frame to rotate in a direction indicated by the arrow. The rotation will cause the plate surface to pass sequentially a series of xerographic processing stations.

For purposes of exemplifying the present disclosure, the several xerographic processing stations in the path of movement of the plate surface are described functionally below.

At charging station A, a uniform electrostatic charge is deposited onto the photoconductive plate. At exposure station B, a light or radiation pattern of copies to be reproduced are projected onto the plate surface to dissipate the charge in the exposed areas thereof to form thereby latent electrostatic images of the copies to be reproduced. At developing station C, xerographic developing material including toner particles having an electrostatic charge opposite to that of the latent electrostatic images, is cascaded over the latent electrostatic images to form powder images in configuration of the copy being reproduced.

At transfer station D, the powder images are electrostatically transferred from the plate surface to a transfer material such as paper, transparent films, and the like, which then is passed through a heated pressure fusing station F having a laminated fuser member 16 made in accordance with the present invention and pressure roll 18. At drum cleaning and discharge station E, the plate surface is brushed or otherwise cleaned to remove residual toner particles remaining thereon after image transfer, and the plate is exposed to a relatively bright light source to effect substantially complete discharge of any residual electrostatic charge remaining thereon. Further details of the xerographic processing stations discussed above and equivalent xerographic processing stations and devices are well known in the art, and the fuser members made in accordance with the present invention can be utilized in any xerographic device requiring the use of a laminated fuser member comprising a metal substrate and an outer resin layer abhesive to molten electroscopic toner.

Figure 2:
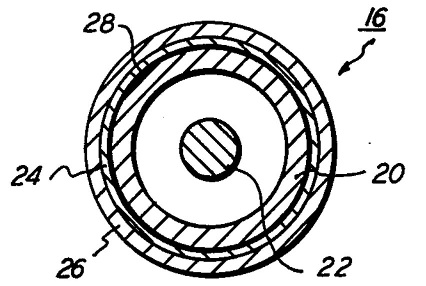
FIG. 2 is an enlarged cross-sectional view of the laminated fuser roll of FIG. 1.

FIG. 2 shows an enlarged fuser roll 16 as illustrated at fusing station F in FIG. 1. Fuser roll 16 of FIG. 2 is a typical fuser roll made in accordance with the lamination technique of the present invention.

The fuser roll structure 16 of FIG. 2 comprises a rigid cylindrical member 20, preferably fabricated from steel or aluminum. The size of the fuser roll varies depending upon the particular xerographic apparatus for which the fuser member is designed. A heater element 22 is supported internally of cylindrical member 20 by appropriate heater sockets (not shown). The heater element may comprise a quartz heater structure including a quartz envelope having a tungsten resistance heating element disposed internally thereof or any other suitable element.

In order to provide fuser member 16 with an outer surface which has a relatively low affinity for tackified toner particles, resin 26 is deposited as an outer layer upon fuser member 16. In the embodiment in FIG. 2, resin copolymer layer 26 is deposited upon primer layer 24. Resin layer 26 in the present invention must be a copolymer of tetrafluoroethylene and perfluoroalkyl perfluorovinyl ether, and in this preferred embodiment it is deposited upon fluoropolymer primer layer 24 in the form of a powder and fused thereon by heating. Furthermore, in accordance with this embodiment of the present invention, the laminated article or fuser member must have fluorocarbon primer layer 24 deposited upon a porous metal plate 28 which is deposited upon rigid cylindrical member 20 by a flame spraying process. Fluorocarbon polymer primer layer 24 must be heated in order to bake the primer layer upon porous metal plate 28. In a preferred embodiment, resin layer 26 is about 0.5 mil (0.013 mm) to about 5 mils (0.13 mm) thick and most preferably is about 1 mil (0.025 mm) or less in thickness for those embodiments having internal heater element 22. Furthermore, for those embodiments having internal heater element 22, primer layer 24 is preferably from about 0.25 mil (0.006 mm) to about 1.25 mil (0.032 mm) in thickness. Although it is not critical, the preferred thickness of the porous metal plate deposited by a flame spraying process is from about 0.005 mm to about 0.032 mm.

The particular manner in which the fuser roll structure 16 is fabricated is critical in the present invention, and the laminating method and article formed thereby are the essence of the present invention.

By controlling the heat transfer to the toner, virtually no offset of the toner particles from the copy sheet to the fuser member surface is experienced under normal conditions. This is because the heat applied to the surface of the fuser member is insufficient to raise the temperature of the surface of the member above the "hot offset" temperature of the toner whereat the toner particles in the image areas of the toner would liquify and cause a shearing action in the molten toner to thereby result in hot offset. Shearing occurs when the interparticle or cohesive forces holding the viscous toner mass together are less than the adhesive forces tending to offset it to a contacting surface such as a fuser member. When toner particles do offset to the fuser roll by an insufficient application of heat to the surface thereof or by any other mechanism well known in the prior art, a low surface energy layer of release agent may be applied to the fuser roll surface. Such release agents as organosiloxane polymer materials, commonly known as silicone oil, may be applied to the surface of fuser roll structure 16, by means of a sump or any other suitable technique. Applicator members such as wicks and the like (not shown) may be used for this purpose. The particular release agent and mode of application do not form a part of the invention disclosed herein.

Figure 3:
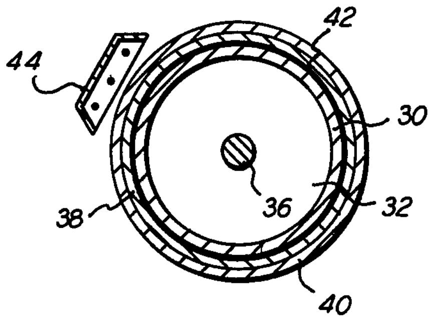
FIG. 3 is a cross-sectional view of an alternative fusing embodiment having a laminated fuser roll made in accordance with the present invention.

FIG. 3 is an alternative fuser roll structure wherein heating is provided by an external heating element. The fuser roll is made in accordance with the lamination technique of the present invention. The fuser roll of FIG. 2 comprises a rigid cylindrical member 30, preferably fabricated from steel or aluminum, mounted upon shaft 36. To provide the outer surface of the fuser member with a relatively low affinity for tackified toner particles, resin 40 is deposited as an outer layer upon the fuser member. Resin layer 40 in FIG. 3 must be a copolymer of tetrafluoroethylene and perfluoroalkyl perfluorovinyl ether, and it must be deposited upon fluoropolymer primer layer 38 in the form of a powder and fused thereon by heating. In accordance with the preferred embodiment of FIG. 3, the laminated article or fuser member has fluorocarbon primer layer 38 deposited upon a porous metal plate 42 which is deposited upon rigid cylindrical member 30 by a flame spraying process. Fluorocarbon polymer primer layer 38 must be heated in order to bake the primer layer upon the porous metal plate 28. In the embodiment of FIG. 3, the thickness of resin coat 40 and primer layer 38 is not critical because heat is provided from an external element or elements, and there is no necessity of depositing sufficiently thin layers for the radiation of heat from an internal source to the outer layer, a critical limitation of the embodiment of FIG. 2. Thus, the thickness may be any desired thickness, for example, from about 0.5 mil (0.013 mm) to about 5 mils (0.127 mm) or greater. Furthermore, primer layer 38 may also be thicker than the embodiment illustrated in FIG. 2, and for example, the thickness of primer layer 38 in the fuser member of FIG. 3 may be 0.006 mm to about 5 mm. Although it is not critical, the preferred thickness of the porous metal plate deposited by a flame spraying process is from about 0.005 mm to about 0.032 mm. In FIG. 3, heater element 44 is illustrated as providing an external source of heat to the surface of resin coat 40. External heating elements are well known in the prior art and may comprise, for example, conventional electrical resistance wires, infrared light source, and the like.

Figure 4:
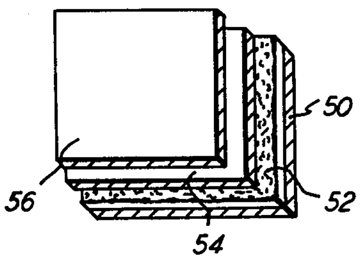
FIG. 4 is a cut away, fragmentary view of a support member laminated in accordance with the present invention.

Referring to FIG. 4, there is shown a fragmentary view of the laminated article made in accordance with the present invention wherein flame sprayed layer 52 is deposited upon metal substrate 50. Primer layer 54, preferably a fluoropolymer primer, is deposited upon the porous flame sprayed layer 52, and resin layer 56 which must be a copolymer of tetrafluoroethylene and perfluoroalkyl perfluorovinyl ether is deposited upon primer layer 54 and fused thereon. In accordance with the present invention, resin layer 56 is deposited upon primer layer 54 in the form of a powder, and the powder is fused thereon by the application of heat.

Figure 5:
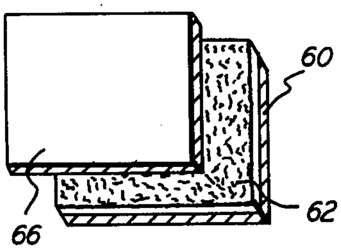
FIG. 5 is a cut away, fragmentary view of a support member having an alternative lamination deposited in accordance with the present invention.

Referring to FIG. 5, there is shown a fragmentary view of an alternative laminated article made in accordance with the present invention wherein flame sprayed layer 62 is deposited upon metal substrate 60. Resin layer 66 which must be a copolymer of tetrafluoroethylene and perfluoroalkyl perfluorovinyl ether is deposited upon porous flame sprayed layer 62 and fused thereon. In accordance with the present invention, resin layer 66 is deposited upon porous flame sprayed layer 62 in the form of a powder, and the powder is fused thereon by the application of heat. This embodiment may be used when resin layer 66 has a thickness greater than about 1 mil (0.025 mm).

The solid resin polymer applied as the outer coating on the article of the present invention must be a copolymer of perfluoroalkyl perfluorovinyl ether. This resin copolymer must be applied to the surface in the form of a powder material. In preferred embodiments, the powder is made up of particles which are generally spherical in shape, however, particles which are non-spherical in shape such as filamentary particles or particles having a high aspect ratio, or powders comprising a mixture of non-spherical and spherical particles may also be used. The particles may be porous or non-porous and generally have an average particle size from about 35 microns (0.005 mm) to about 150 microns (0.15 mm), and more preferably between about 5 microns (0.005 mm) to about 75 microns (0.075 mm). The density of the resin copolymer powder of perfluoroalkyl perfluorovinyl ether and tetrafluoroethylene is generally less than about 0.85, and preferably between about 0.35 and 0.6. It has been found that generally one coat of the resin polymer is sufficient for spherical particles, however, where the particles are non-spherical or mixtures of spherical and non-spherical, then best results are generally obtained with a two-coat or multiple-coat process where two or more coats of resin copolymer particles are applied to the substrate.

A resin copolymer of perfluoroalkyl and perfluorovinyl ether and tetrafluoroethylene is described in U.S. Pat. No. 3,132,123, the perfluoroalkyl perfluorovinyl ether having the formula: $C_nF_{2n+1}—O—CF═CF_2$, where n is a number from 1 to 5 inclusive. Examples of the perfluoroalkyl perfluorovinyl ethers are perfluoromethyl, perfluorovinyl ether, perfluoropropyl perfluorovinyl ether, perfluoroethyl perfluorovinyl ether, perfluorobutyl perfluorovinyl ether, and the like. The preparation of a high molecular weight copolymer of tetrafluoroethylene and perfluoroalkyl perfluorovinyl ether is described in Example III of U.S. Pat. No. 3,132,123. Powders of the copolymers may be prepared by techniques well known in the art. Spherical and non-spherical particles may be prepared by well-known polymerization techniques or particles may be prepared by the comminution of solid copolymer chunks.

The resin copolymer of perfluoroalkyl perfluorovinyl ether and tetrafluoroethylene is a crystalline resin and is used in a thermoplastic (uncrosslinked) form. By thermoplastic form is meant that no crosslinking agents or techniques which cause crosslinking of the polymer chains are employed in the formation or application of the copolymer resin powder. By use of the term "resin" herein, is meant the crystalline form of the copolymer of tetrafluoroethylene and perfluoroalkyl perfluorovinyl ether as opposed to the elastomeric copolymers which are present in non-crystalline forms. Naturally, other groups may be substituted upon the polymer chains and functional groups attached thereto as long as they do not interfere with the application of the copolymer resin upon the articles of the present invention or compromise the integrity of the fused resin present as the surface layer upon the articles of the present invention. Furthermore, it is within the scope of the present invention to apply multiple layers or coats of the copolymer resin to the surface of the article of the present invention.

In accordance with the present invention, the copolymer resin of perfluoroalkyl perfluorovinyl ether and tetrafluoroethylene are deposited as a powder upon a primer layer. One of the preferred techniques of applying the powder to the primer layer is by means of an electrostatic powder coating process. In this type of spraying technique, the resin powder is statically charged and sprayed upon the primer layer substrate. Conventional electrostatic powder coating or spraying processes and equipment are well known in the art.

It has been found that the optimum thickness of the copolymer resin of perfluoroalkyl perfluorovinyl ether and tetrafluoroethylene in a xerographic reproducing apparatus varies according to the particular type of heat transfer desired. In an internally heated fuser member, the thickness of the fused resin copolymer is from about 0.5 mil (0.013 mm) to about 5 mils (0.13 mm). However, for externally heated fuser members and for other applications such as cooking utensil surfaces, the thickness of the fused resin copolymer may be greater than 5 mils (0.13 mm) and may be applied in multiple coating steps up to a thickness of 2 or 3 centimeters or more. When the thickness has been achieved by one coating or by successive coatings, the copolymer resin of tetrafluoroethylene and perfluoroalkyl perfluorovinyl ether is fused at a temperature sufficient to fuse the powdered resin copolymer until fusion thereof is complete. Optimum conditions generally require heat at about 300° C. to about 425° C. or higher depending upon the melting point of the resin copolymer, for about 5 to 60 minutes and more preferably about 10 to about 20 minutes.

In addition to U.S. Pat. No. 3,132,123, other references setting forth detailed information concerning the preparation of the copolymer resins of tetrafluoroethylene and perfluoroalkyl perfluorovinyl ether include Canadian Pat. No. 894,898 and the article entitled "A High Performance Fluorocarbon Elastomer", Journal of Polymer Science, Part A-1, Volume 8, pp. 1091–1098 (1970). The copolymer resins of the present invention having tetrafluoroethylene units and perfluoroalkyl perfluorovinyl ether units provide the best results when the amount of the monomer in the polymer chain is greater than about 30 mole percent and preferably from about 30 to about 50 mole percent of the polymer chain. Copolymer resins containing repeating tetrafluoroethylene units and repeating perfluoroalkyl perfluorovinyl ether units which have less than about 30 mole percent of the ether monomer in the polymer chain, can also be used in the present invention, although such monomers are believed to exhibit somewhat lower temperature stability and somewhat less chemical resistance properties. As noted above, the copolymer resins of the present invention are thermoplastic copolymers, that is, they are not vulcanized nor are curing agents or crosslinking agents admixed with the copolymer which would cause any crosslinking of the polymer chains. Thus, the copolymer resins of the present invention remain resinous, crystalline materials as opposed to the pliable, flexible elastomeric copolymers discussed in some of the prior art references. Copolymer resin powders supplied by E. I. duPont deNemours and Company under the trade designation Teflon PFA have been useful as a copolymer resin in the present invention.

The resin copolymer of tetrafluoroethylene and perfluoroalkyl perfluorovinyl ether may be be applied to a fluoropolymer primer surface or to a porous flame sprayed surface in accordance with the present invention. In embodiments having a thickness of 1 mil (0.025 mm) or less of resin copolymer, at least one layer or application of fluoropolymer primer is placed upon a porous flame sprayed layer to provide a surface for securely fusing the resin copolymer of tetrafluoroethylene and perfluoroalkyl perfluorovinyl ether. The fluoropolymer primer (fluorocarbon polymer primer) is applied to the substrate only after the substrate has been properly prepared. In accordance with the present invention, the fluoropolymer primer is applied to a porous flame sprayed metal layer, details of which are discussed below. The fluoropolymer primer layer may also be applied where the resin copolymer has a thickness greater than 1 mil (0.025 mm).

A number of fluorocarbon polymer primers or fluoropolymer primers are commercially available. Emeralon 301 supplied by Acheson Industries, Inc. is especially suitable as a primer for use in the present invention. Exemplary of the fluorocarbon polymer primers which may be used as the primer layer in accordance with the present invention are tetrafluoroethylene, hexafluoropropylene, monochlorotrifluoroethylene, tetrafluoroethylene/hexafluoropropylene and the like. In addition to the foregoing fluorocarbon polymers useful as the primers of the present invention, the homopolymer of perfluoroalkyl perfluorovinyl ether, the copolymer of tetrafluoroethylene and perfluoroalkyl perfluorovinyl ethers and fluorinated ethylene propylene polymers may also be used as the primer material. The primer layer may comprise any fluorocarbon polymer (fluoropolymer) to which the resin copolymer of tetrafluoroethylene and perfluoroalkyl perfluorovinyl ether will adhere.

In one preferred embodiment, the primer material is applied to the porous flame sprayed substrate in the form of an acid film. The acid primer film, which is a liquid, may be conveniently applied by air atomization, by spraying, by dipping or by any other suitable means, either manually, or preferably automatically. A preferred acid primer is a chromic acid/phosphoric acid polytetrafluoroethylene material in water. Other acid media such as phosphoric acid/sulfuric acid and other well known acid primer combinations may be used as the preferred embodiment. The acid primer film typically contains about 30 to 50 percent water. Other adjuvants may also be employed in the acid primer composition.

In order to fix or secure the liquid fluorocarbon polymer primer film deposited upon the porous flame sprayed substrate, a drying and/or baking step is recommended to remove water and any volatile materials which may be present in the fluid medium. In a preferred embodiment, the liquid primer film is first dried at a temperature of about 80° C. or below, and is preferably carried out by air drying. The drying step can also be performed at room temperature by allowing the coated substrate to stand for 10 to 30 minutes under low humidity, 3 g. 40% relative humidity, conditions. After the optional drying step, the primer layer or film may optionally be subjected to a baking temperature of from about 80° C. to about 260° C. and more preferably from about 87° C. to about 110° C. in order to fuse the primer material, such as tetrafluoroethylene primer to the porous flame sprayed metal substrate. The baking may be carried out for a period of time sufficient to fuse the fluorocarbon polymer primer film. Typically, this baking step may be carried out for a period of from about 10 minutes to about 30 minutes, depending upon the temperature used for the fusing of the fluoropolymer primer. In a preferred embodiment, the liquid fluoropolymer primer is applied in a thickness which will provide a baked or fused primer layer of from about 0.013 mm to about 0.13 mm, however, depending upon the utility of the finished product, the baked or fused primer layer or layers may be several mils or greater in thickness.

The substrate to which the primer layer or alternatively, the resin copolymer layer are applied, may be any substrate upon which a porous flame sprayed metal layer can be deposited. In preferred embodiments the substrate may be made of a metal such as aluminum, steel, stainless steel, nickel, copper, molybdenum, and various alloys of the foregoing, and the like. In a preferred embodiment, the metal substrate is grit blasted or otherwise surfaceroughened prior to the application of the porous, flame sprayed metal substrate thereto. Thus, as used herein, there is provided a first or primary substrate layer upon which a porous, flame sprayed metal surbstrate is deposited, and the first or primary substrate may be grit blasted or otherwise surface-roughened prior to the application of the porous, flame sprayed metal thereto. The primary substrate may be of any shape, size, configuration, and the like, depending upon the desired utility of the final article.

In accordance with the present invention, the primer or alternatively, the resin copolymer when no primer is used, must be deposited upon a porous plate of metal deposited by a conventional flame spraying process. Flame spraying processes are well known in the prior art and have been described in British Pat. No. 1,184,561 and U.S. Pat. No. 3,942,230.

The flame spraying process may be of the wire type or may be a plasma flame spraying process. The material which is deposited upon the primary substrate in the form of a porous metal plate, may comprise steel, stainless steel, nickel, nickel/chromium, molybdenum and the like, however, for the purposes of the present invention, the preferred plating material is a stainless steel having a high chromium content. Thus, when a flame spray process utilizing a wire is used, the wire preferably comprises stainless steel having a high chromium content, for example, a wire generally designated as number 304 stainless steel wire. A single pass or a multiple pass application may be used to "wire" flame spray or "plasma" flame spray the primary substrate, and the porous metal plate or porous flame sprayed metal may be deposited to any desired depth. In accordance with the present invention, the flame sprayed metal plate is preferably deposited at a thickness of from about 0.006 mm to about 0.032 mm.

In preferred embodiments, the oxidizing power of the flame and the conditions of the flame spraying process are carried out under conditions which provide a minimum amount of oxidation so that the amount of oxide which forms upon the porous metal plate is kept at a minimum. Accordingly, in preferred embodiments, the metal which is flame sprayed upon the support member (primary substrate) is one which is generally resistant to oxidation. For example, a stainless steel metal having a high chromium content, for example, a chromium content greater than 10 percent, is flame sprayed upon the support member. Furthermore, the flame sprayed metal plate or layer is deposited by a low or slightly oxidizing flame or a non-oxidizing flame. The oxidizing power of a flame can be varied by adjusting the ratio of oxygen to fuel gas. In a preferred embodiment, MAPP gas is used as the fuel gas. The amount of oxide can be decreased in this manner, and best results can be obtained when the flame is a "reducing" flame. The oxidizing character of the flame can also be decreased by using nitrogen rather than air to atomize the molten wire being flame sprayed upon the support member.

In accordance with the present invention, at least one layer of the porous, flame sprayed metal must be deposited upon the support member to achieve the desired bonding of the primer layer or alternatively the layer of resin copolymer of tetrafluoroethylene and perfluoroalkyl perfluorovinyl ether.

The following specific examples describes the method and article of this invention. They are intended for illustrative purposes only and should not be construed as a limitation.

EXAMPLE I

An aluminum cylinder of the type conventionally used as a fuser roll for a xerographic reproducing apparatus was turned on a lathe. The surface of the aluminum core was roughened by grit blasting to clean the surface and flame sprayed with a layer of stainless steel by making two six second passes so that the thickness of the stainless steel on the roughened core was about 0.004 mm. The flame spraying process was carried out by means of a conventional, commercial technique and equipment using number 304 stainless steel wire in the flame spraying process. The atomizing gas was nitrogen and the fuel gas was MAPP gas with about 60% (by volume) oxygen to produce a slightly oxidizing flame. After the layer of porous stainless steel was deposited upon the roughened core, a chromic acid/phosphoric acid primer containing tetrafluoroethylene in water was applied to the flame sprayed surface by rotating the roll in a paint spray booth. Emeralon 301 supplied by Acheson Industries, Inc. was the primer used in this example. The amount of primer applied to the flame sprayed layer of stainless steel was sufficient to provide a dried primer layer of tetrafluoroethylene about 0.0025 mm thick. The roll was dried for 20 minutes at ambient temperature (21° C.) and 40% relative humidity and heated in a preheated oven for 20 minutes at about 87° C. to 100° C. The roll was air colled to ambient.

A powdered resin copolymer of tetrafluoroethylene and perfluoroalkyl perfluorovinyl ether supplied by E. I. duPont deNemours and Company under the trade designation Teflon PFA was applied to the primer layer by means of an electrostatic spraying process under 60 kilovolts for about 3 seconds to provide a final thickness of about 0.0254 mm. The powder coated roll was heated in a preheated oven at 413° C. for 10 to 30 minutes to fuse the powder coat upon the surface of the roll. The roll was removed from the oven after about 1 hour and allowed to cool to ambient. The coated roll was then cleaned by grit blasting.

A lamp heater was mounted inside the core of the roll to form a fuser roll for an electrostatographic reproducing apparatus. The fuser roll was mounted in a conventional apparatus in conjunction with a conventional pressure roll, and the system was used to fix or fuse toner images to a paper substrate. The roll was used to fuse 750,000 copies in the laboratory prior to failure due to separation of the resin copolymer from the roll. The abrasion resistance and the integrity of the copolymer resin on the surface of the fuser roll was far superior to that of other surfaces tested.

EXAMPLE II

A fuser roll was prepared under the same conditions and using the sa ne substrate and primer as disclosed in Example I. Instead of depositing a powdered resin copolymer of tetrafluoroethylene and perfluoroalkyl perfluorovinyl ether as set forth in Example I, a powdered resin of tetrafluoroethylene supplied by E. I. duPont de Nemours and Company under the trade designation Teflon TFE was applied to the primer layer by the same technique using the same conditions. The fuser roll prepared in this manner was used to fuse only 450,000 copies prior to failure of the roll.

EXAMPLE III

A powdered resin copolymer of tetrafluoroethylene and perfluoroalkyl perfluorovinyl ether supplied by E. I. duPont de Nemours and Company under the trade designation Teflon PFA was applied to an aluminum cylinder prepared in accordance with the aluminum cylinder of Example I. The conditions and equipment for the application of the powdered resin copolymer were identical to those set forth in Example I except no stainless steel and no primer were deposited upon the substrate. A fuser roll prepared in accordance with the technique set forth in Example I was used to fix or fuse toner images to a paper substrate. Blistering occurred on the surface of the roll at about 150,000 copies at the path of the 11 inch paper edge. The wear rate was about 0.15 mil (0.004 mm) per 100,000 copies.

A similar fuser roll having a final thickness of about 1.1 mil (0.028 mm) copolymer resin (Teflon PFA) did not blister up to 150,000 copies, however, the wear rate remained at about 0.15 mil per 100,000 copies.

EXAMPLE IV

A fuser roll was prepared by depositing a powdered resin copolymer of tetrafluoroethylene and perfluoroalkyl and perfluorovinyl ether supplied by E. I. duPont de Nemours and Company under the trade designation Teflon PFA upon a flame sprayed stainless steel substrate without a primer under the conditions of Example I except an oxidizing flame was used to flame spray the stainless steel upon the aluminum cylinder. This was accomplished by increasing the amount of oxygen mixed with the fuel gas.

A fuser roll prepared in the manner of Example I and used to fix or fuse toner images to a paper substrate showed pock marks after about 200,000 copies. It was also observed in this series of experiments that blistering can occur if the flame sprayed stainless steel (deposited with an oxidizing flame) is exposed to water.

EXAMPLE V

A powdered resin copolymer of tetrafluoroethylene and perfluoroalkyl perfluorovinyl ether supplied by E. I. duPont de Nemours and Company under the trade designation Teflon PFA was applied to a flame sprayed stainless steel coated substrate in a technique similar to that disclosed in Example I except a non-oxidizing flame was used to deposit the slame sprayed stainless steel and no primer layer was deposited thereon. A fuser roll prepared in accordance with the technique set forth in Example I did not blister even when the flame sprayed stainless steel was exposed to water. However, when the final PFA Teflon thickness was about 0.7 to about 1.0 mil, offsetting of toner occurred. When the thickness of the PFA Teflon deposited upon the stainless steel flame sprayed substrate was greater than 1.0 mil, the offsetting did not occur. Wear life tests were not conducted upon this fuser roll because wear life was expected to be very good.

EXAMPLE VI

A fuser roll prepared in accordance with Example I above using identical conditions and materials was placed in a 9200 Xerox copier (9200 and Xerox are trademarks of Xerox Corporation). Under operating conditions, the fuser was used to fix toner images to paper substrates for 1,100,000 copies.

In accordance with the objects of the present invention, the method of laminating or coating metal substrates in accordance with the present invention and the articles formed thereby not only promote the release of tackified toner or other sticky substances therefrom but also permits the deposit of a thin film (less than 1 mil in thickness) of the resin copolymer without sacrificing integrity of the bond to the substrate or abrasion resistance of the copolymer resin.

While the present invention has been described in detail with particular reference to certain preferred embodiments thereof, it will be understood that variations and modifications can be affected within the spirit and scope of the invention.

What is claimed is:

1. A method for manufacturing a laminated article having a support member and a surface layer of a resin copolymer of tetrafluoroethylene and perfluoroalkyl perfluorovinyl ether comprising:
   (a) providing a support member;
   (b) applying a porous metal plate on the support member by a flame spraying process;
   (c) applying fluoropolymer primer to the porous metal plate;
   (d) drying the fluoropolymer primer;
   (e) applying powder resin copolymer of tetrafluoroethylene and perfluoroalkyl perfluorovinyl ether to the dried primer-coated metal plate; and
   (f) heating the powder resin copolymer at a temperature sufficient to fuse the powder resin copolymer until fusion is complete.

2. The method of claim 1 wherein the flame sprayed metal plate is from about 0.15 mil (0.004 mm) to about 1.25 mil (0.032 mm) thick.

3. The method of claim 1 wherein the fluoropolymer primer is applied to the porous metal plate by spraying.

4. The method of claim 1 wherein the fluoropolymer primer is heated at a temperature from about 87° C. to about 110° C.

5. The method of claim 1 wherein the powder resin copolymer of tetrafluoroethylene and perfluoroalkyl perfluorovinyl ether is applied by an electrostatic powder coating process.

6. The method of claim 1 wherein the powder resin copolymer of tetrafluoroethylene and perfluoroalkyl perfluorovinyl ether is applied in a thickness of from about 0.5 mil (0.013 mm) to about 5 mils (0.13 mm).

7. The method of claim 1 wherein powder resin copolymer of tetrafluoroethylene and perfluoroalkyl perfluorovinyl ether is heated at about 300° C. to about 425° C.

8. The method of claim 1 wherein the powder resin copolymer of tetrafluoroethylene and perfluoroalkyl perfluorovinyl ether comprises substantially spherical beads with a diameter from about 5 microns (0.005 mm) to about 150 microns (0.15 mm).

9. The method of claim 1 further comprising the step of grit blasting the metal substrate prior to applying the porous metal substrate.

10. The method of claim 1 wherein the fluoropolymer primer is acidic.

11. A method for manufacturing a laminated fuser member having a metal substrate and a surface layer of a resin copolymer of tetrafluoroethylene and perfluoroalkyl perfluorovinyl ether comprising:
   (a) providing a metal substrate as a support member;
   (b) applying a porous, stainless steel plate on the metal substrate by a flame spraying process using a low oxidizing flame and an inert gas as an atomizing gas;

(c) applying acid fluoropolymer primer to the flame sprayed, porous stainless steel plate;

(d) drying the acid fluoropolymer primer until the primer is dried upon the flame sprayed, porous stainless steel plate;

(e) applying sufficient powder resin copolymer of tetrafluoroethylene and perfluoroalkyl perfluorovinyl ether to the dried primer-coated stainless steel plate so that the fused resin copolymer has a thickness of about 0.006 mm to about 0.032 mm, said powder resin copolymer being applied by an electrostatic powder coating process; and (f) heating the powder resin copolymer at a temperature of about 300° C. to about 425° C. to fuse the powder resin copolymer.

12. The method of claim 11 wherein the powder resin copolymer is applied in the form of substantially spherical beads having a diameter from about 5 microns (0.005 mm) to about 150 microns (0.15 mm).

13. The fuser member made by the method of claim 11.

14. A laminated article comprising:

a support member having a porous flame sprayed metal surface layer;

a fluoropolymer primer dried upon the flame sprayed metal surface; and an outer layer over said primer, said outer layer comprising a copolymer resin of perfluoroalkyl perfluorovinyl ether with tetrafluoroethylene, said ether having the formula $C_nF_{2n+1}—O—CF=CF_2$, said outer layer being placed upon the dried primer in the form of a powder coating and fused thereon.

15. An article according to claim 14 wherein n is a number from 1 to 5 inclusive.

16. The article of claim 14 wherein the outer layer has a thickness of about 0.2 mil (0.005 mm) to about 5 mils (0.13 mm).

17. The article of claim 14 wherein the flame sprayed metal layer is deposited by a low oxidizing flame.

18. The article of claim 14 wherein the flame sprayed metal upon the support member is stainless steel.

19. The article of claim 18 wherein the chromium content of the stainless steel is high.

20. The article of claim 14 wherein the flame sprayed metal layer is deposited by a flame spray process using an inert gas as an atomizing gas.

21. The article of claim 14 wherein the flame sprayed layer is about 0.15 mil (0.004 mm) to about 1.25 mil (0.032 mm).

22. The article of claim 14 wherein the support member is a fuser roll.

23. The article of claim 14 wherein the support member is a fuser plate.

24. The article of claim 14 wherein the support member is a fuser belt.

25. The article of claim 14 wherein the thickness of the flame sprayed metal surface is from about 0.004 mm to about 0.032 mm.

26. A method for manufacturing a laminated article having a support member and a surface layer of a resin copolymer of tetrafluoroethylene and perfluoroalkyl perfluorovinyl ether comprising:

(a) providing a support member;

(b) applying a porous metal plate on the support member by a flame spraying process;

(c) applying powder resin copolymer of tetrafluoroethylene and perfluoroalkyl perfluorovinyl ether to the porous metal plate; and (d) heating the powder resin copolymer at a temperature sufficient to fuse the powder resin copolymer until fusion is complete.

27. The method of claim 26 wherein the flame sprayed metal plate is from about 0.004 mm to about 0.032 mm in thickness.

28. The method of claim 26 wherein the powder resin copolymer of tetrafluoroethylene and perfluoroalkyl perfluorovinyl ether is applied by an electrostatic powder coating process.

29. The method of claim 26 wherein the powder resin copolymer of tetrafluoroethylene and perfluoroalkyl perfluorovinyl ether is applied in a thickness of from about 0.025 mm to about 0.13 mm.

30. The method of claim 26 wherein the powder resin copolymer of tetrafluoroethylene and perfluoroalkyl perfluorovinyl ether is heated at about 300° C. to about 425° C.

31. The fuser member made by the method of claim 26.

32. A laminated article comprising:

a support member having a porous flame sprayed metal surface layer;

an outer layer over said porous flame sprayed metal surface layer, said outer layer comprising a copolymer resin of perfluoroalkyl perfluorovinyl ether with tetrafluoroethylene, said ether having the formula: $C_nF_{2n+1}—O—CF=CF_2$, said outer layer being placed upon the porous flame sprayed metal surface layer in the form of a powder coating and fused thereon.

33. An article according to claim 32 wherein n is a number from 1 to 5 inclusive.

34. The article of claim 32 wherein the outer layer has a thickness of about 1 mil (0.025 mm) to about 5 mils (0.13 mm).

35. The article of claim 32 wherein the flame sprayed metal layer is deposited by a low oxidizing flame.

36. The article of claim 32 wherein the flame sprayed metal upon the support member is stainless steel.

37. The article of claim 36 wherein the chromium content of the stainless steel is high.

38. The article of claim 32 wherein the flame sprayed metal layer is deposited by a flame spray process using an inert gas as an atomizing gas.

39. The article of claim 32 wherein the flame sprayed layer is about 0.004 mm to about 0.032 mm.

40. The article of claim 32 wherein the support member is a fuser roll.

41. The article of claim 32 wherein the support member is a fuser plate.

* * * * *